US009699717B2

(12) United States Patent
Wellington (10) Patent No.: US 9,699,717 B2
(45) Date of Patent: Jul. 4, 2017

(54) RESOLVING IDENTIFICATION CODE AMBIGUITIES IN WIRELESS ACCESS NETWORKS

(71) Applicant: Nokia Solutions and Networks OY, Espoo (FI)

(72) Inventor: Dan Wellington, Bothell, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/065,168

(22) Filed: Mar. 9, 2016

(65) Prior Publication Data

US 2016/0192284 A1    Jun. 30, 2016

Related U.S. Application Data

(63) Continuation of application No. 14/459,191, filed on Aug. 13, 2014, now Pat. No. 9,319,979.

(60) Provisional application No. 61/929,449, filed on Jan. 20, 2014, provisional application No. 61/929,458, filed on Jan. 20, 2014, provisional application No. 61/929,452, filed on Jan. 20, 2014.

(51) Int. Cl.
*H04W 48/16* (2009.01)
*H04W 48/20* (2009.01)
*H04J 11/00* (2006.01)

(52) U.S. Cl.
CPC ......... *H04W 48/16* (2013.01); *H04J 11/0069* (2013.01); *H04W 48/20* (2013.01)

(58) Field of Classification Search
CPC ..... H04W 48/16; H04W 48/02; H04W 48/20; H04W 24/02; H04W 36/08; H04W 48/08; H04W 64/00; H04W 64/003
See application file for complete search history.

(56) References Cited

U.S. PATENT DOCUMENTS

| 8,320,351 B2 * | 11/2012 | Aqvist .............. H04W 36/0083 370/342 |
| 9,319,979 B2 * | 4/2016 | Wellington ........... H04W 48/20 |
| 2010/0087194 A1 * | 4/2010 | MacNaughtan ...... H04W 64/00 455/435.2 |

(Continued)

FOREIGN PATENT DOCUMENTS

| WO | WO 2008/057658 A2 | 5/2008 |
| WO | WO 2013/095228 A1 | 6/2013 |
| WO | WO 2013/160708 A1 | 10/2013 |

OTHER PUBLICATIONS

International Search Report and Written Opinion for PCT/US2014/050958, filed Aug. 13, 2014.

*Primary Examiner* — Kenneth Lam (57) ABSTRACT

Systems and methods for resolving identification code ambiguities in wireless access networks are described. In some embodiments, the systems and methods access an identification code associated with a cell in a wireless access network that is detected by a mobile device, determine a probability score for candidate cells that are assigned the identification code in the wireless access network, the probability score based on a likelihood that a candidate cell is a cell in the wireless access network associated with the identification code detected by the mobile device, and select one of the candidate cells as an origination cell of the identification code detected by the mobile device based on the determined probability scores.

15 Claims, 8 Drawing Sheets

(56) References Cited

U.S. PATENT DOCUMENTS

| | | | |
|---|---|---|---|
| 2010/0091702 A1* | 4/2010 | Luo | H04J 11/0069 370/328 |
| 2010/0177758 A1* | 7/2010 | Aqvist | H04W 36/0083 370/342 |
| 2010/0272070 A1 | 10/2010 | Quilty et al. | |
| 2012/0315895 A1 | 12/2012 | Jovanovic et al. | |
| 2013/0237217 A1* | 9/2013 | Klein | H04J 11/0073 455/434 |
| 2014/0029521 A1* | 1/2014 | Puthenpura | H04L 5/0053 370/329 |
| 2014/0056190 A1* | 2/2014 | Qian | H04W 28/048 370/280 |

* cited by examiner

RESOLVING IDENTIFICATION CODE AMBIGUITIES IN WIRELESS ACCESS NETWORKS

CROSS-REFERENCES TO RELATED APPLICATIONS

This application is a continuation of and claims priority to U.S. application Ser. No. 14/459,191, filed Aug. 13, 2014, which claims priority to U.S. Provisional Application No. 61/929,452, filed on Jan. 20, 2014, entitled AUTOMATED METHOD FOR RESOLVING SCRAMBLING CODE AMBIGUITIES IN WIRELESS ACCESS NETWORKS, U.S. Provisional Application No. 61/929,449, filed on Jan. 20, 2014, entitled SYSTEM AND METHODS FOR OPTIMIZING WIRELESS SYSTEM REUSE CODES BASED ON MEASUREMENTS AND REUSE EXCLUSION ZONES, and U.S. Provisional Application No. 61/929,458, filed on Jan. 20, 2014, entitled ENHANCED AUTOMATED NEIGHBOR LIST MANAGEMENT UTILIZING CASE SPECIFIC OPTIMIZATION AND GEOSCORING, which are hereby incorporated by reference in their entirety.

BACKGROUND

Wireless networks rely on a large number of individual base stations or cells to provide high capacity wireless services over large coverage areas, such as market areas (e.g., cities), surrounding residential areas (e.g., suburbs, counties), highway corridors and rural areas. Continuous radio connectivity across these large coverage areas is accomplished via user mobility from one base station to others as the user traverses the network's operating area. High reliability mobility in mobile wireless networks minimizes the number of dropped calls or other abnormal discontinuations of radio service to the supported users.

Modern broadband wireless access technologies, such as the Universal Mobile Telecommunication System (UMTS), High Speed Packet Access (HSPA), Long Term Evolution (LTE), and so on, rely on the reuse of a finite number of codes, which are used by mobile devices to differentiate signals originating from different base stations in a network. These codes, such as 3G scrambling codes or 4G PCI codes, are reused multiple times across wide area networks, often with the same code being allocated to multiple base stations in the networks.

Because multiple cells in a network often share a single code (e.g., a single code is reused across multiple cells), uncertainty may arise as to which cell is an actual transmitter of the code when a wireless device detects the code (e.g., via a signal strength measurement or signal quality measurement associated with the code). This uncertainty leads to ambiguity within the network, which can degrade the performance of automated network processes performed within the network. For example, Automated Neighbor Relations (ANR) management processes may receive ambiguous or uncertain cell identification information as input information into running ANR processes, leading to sub-optimal provisioning of cells within the network, among other drawbacks.

SUMMARY

Systems and methods for resolving identification code ambiguities in wireless access networks are described. In some embodiments, the systems and methods access an identification code associated with a cell in a wireless access network that is detected by a mobile device, determine a probability score for candidate cells that are assigned the identification code in the wireless access network, the probability score based on a likelihood that a candidate cell is a cell in the wireless access network associated with the identification code detected by the mobile device, and select one of the candidate cells as an origination cell of the identification code detected by the mobile device based on the determined probability scores.

For example, the systems and methods may determine a probability score for the candidate cells using one or more of the following operations: calculating a number of intra-frequency neighbors that overlap between a predetermined source cell and the candidate cell, calculating a number of scrambling codes that overlap between the predetermined source cell and the candidate cell, determining whether the predetermined source cell is on a neighbor list associated with the candidate cell, determining whether the predetermined source cell is on a detected set report associated with the candidate cell, and/or calculating an inverse of a distance or geoscore between the predetermined source cell and the candidate cell.

In some embodiments, the systems and methods may disambiguate a scrambling code detected within a wireless access network by determining a probability score for candidate cells that are assigned the scrambling code in the wireless access network via calculating a number of intra-frequency neighbors that overlap between a predetermined source cell and the candidate cell, calculating a number of scrambling codes that overlap between the predetermined source cell and the candidate cell, determining whether the predetermined source cell is on a neighbor list associated with the candidate cell, determining whether the predetermined source cell is on a detected set report associated with the candidate cell, and/or calculating an inverse of a distance or geoscore between the predetermined source cell and the candidate cell, and selecting a candidate cell having a determined probability score above a disambiguation threshold score (e.g., a highest determined probability score) as an origination cell of the scrambling code.

DETAILED DESCRIPTION

Systems and methods for resolving identification code ambiguities in wireless access networks, and providing unambiguous and certain codes and associated cell identifications to various wireless access network systems and processes, are described.

For example, the systems and methods described herein may identify a correct wireless base station associated with a particular reuse code in order to prevent ambiguous field measurements during automated network optimization processes. The systems and methods described herein may disambiguate scrambling codes used in UMTS networks or other reuse codes, such as BSIC/UARFCN codes in GSM networks, PCI codes in 3GPP Long Term Evolution (LTE) networks, and so on.

In the following detailed description, reference is made to the accompanying drawings, which form a part of the description. The embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The technology can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term processor refers to one or more devices, circuits, and/or processing cores configured to process data, such as computer program instructions.

A detailed description of embodiments is provided below along with accompanying figures that illustrate the principles of the technology. The technology is described in connection with such embodiments, but the technology should not be limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of illustration and the technology may be practiced according to the claims without some or all of these specific details. For the purpose of clarity, technical material that is known in the technical fields related to the technology has not been described in detail so that the technology is not unnecessarily obscured.

Examples of the Network Environment

Figure 1:
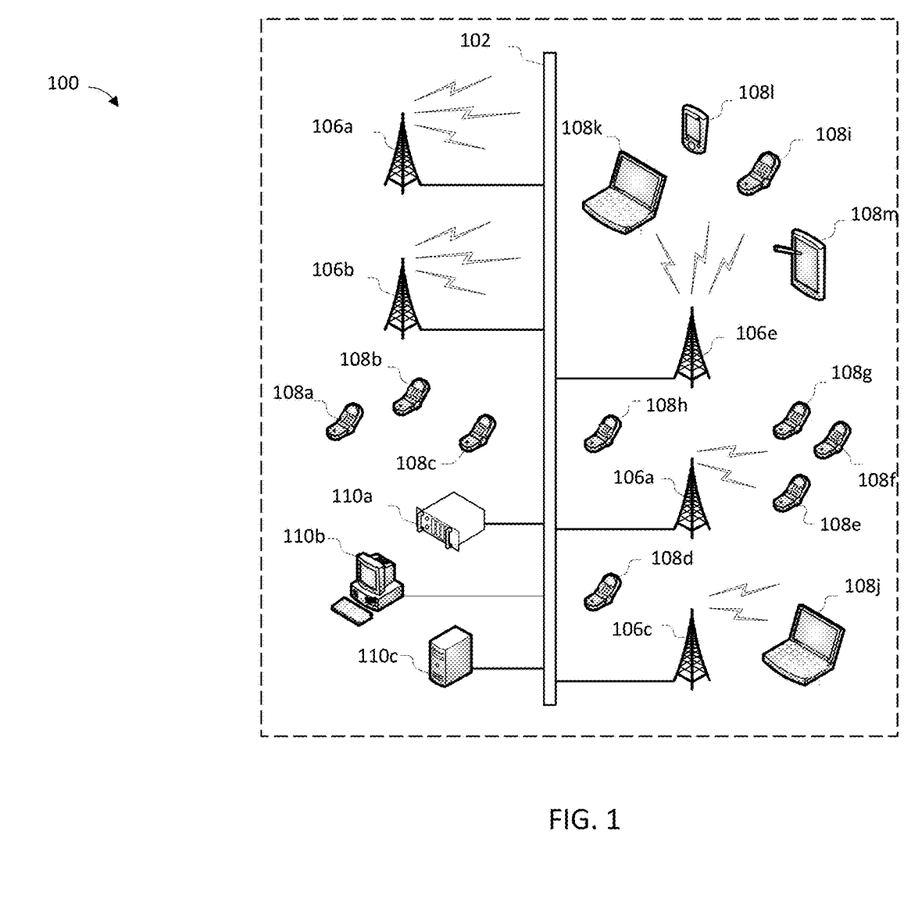
FIG. 1 is a block diagram illustrating a suitable network environment.

FIG. 1 illustrates an example network environment 100, which may include a code disambiguation system that is configured to disambiguate identification codes within the network environment 100. Any of the machines, databases, or devices shown in FIG. 1 and other Figures described herein may be implemented in a general-purpose computer modified (e.g., configured or programmed) by software to be a special-purpose computer to perform the functions described herein for that machine, database, or device. Moreover, any two or more of the machines, databases, or devices illustrated in FIG. 1 may be combined into a single machine, and the functions described herein for any single machine, database, or device may be subdivided among multiple machines, databases, or devices.

As depicted, the network environment 100 includes a data communications network 102, one or more base stations or cells 106$a$-$e$, one or more network resource controllers 110$a$-$c$, and one or more User Equipment (UE) 108$a$-$m$, such as mobile devices, wireless devices, or other computing devices. As used herein, the term "base station" refers to a wireless communications station or cell provided in a location that serves as a hub of a wireless network. The base stations may be used with macrocells, microcells, picocells, and femtocells.

The data communications network 102 may include a backhaul portion that can facilitate distributed network communications between any of the network controller devices 110 $a$-$c$ and any of the base stations 106$a$-$e$. Any of the network controller devices 110$a$-$c$ may be a dedicated Network Resource Controller (NRC) that is provided remotely from the base stations or provided at the base station, and may include a rollback system and/or components of a rollback system. Any of the network controller devices 110$a$-$c$ may be a non-dedicated device that provides NRC functionality among others. The one or more UE 108$a$-$m$ may include cell phone devices 108$a$-$i$, laptop computers 108$j$-$k$, handheld gaming units 108$l$, electronic book devices or tablet PCs 108$m$, and any other type of common portable wireless computing device that may be provided with wireless communications service by any of the base stations.

The backhaul portion of a data communications network 102 may include intermediate links between a backbone of the network, which are generally wire line, and sub networks or base stations 106$a$-$e$ located at the periphery of the network. For example, cellular user equipment (e.g., any of UE 108$a$-$m$) communicating with one or more base stations 106$a$-$e$ may constitute a local sub network. The network connection between any of the base stations 106$a$-$e$ and the rest of the world may initiate with a link to the backhaul portion of an access provider's communications network 102 (e.g., via a point of presence).

In some embodiments, the NRC has presence and functionality that may be defined by the processes it is capable of carrying out. Accordingly, the conceptual entity that is the NRC may be generally defined by its role in performing processes associated with embodiments of the present disclosure. Therefore, the NRC entity may be considered to be either a hardware component and/or a software component that is stored in computer readable media such as volatile or non-volatile memories of one or more communicating device(s) within the networked computing system 100.

In some embodiments, any of the network controller devices 110$a$-$c$ and/or base stations 106$a$-$e$ may function independently or collaboratively to implement processes associated with various embodiments of the present disclosure described herein. Further, processes for dynamically optimizing network elements of a network, such as newly added network element, may be carried out via various communication protocols, such as those associated with modern Global Systems for Mobile (GSM), Universal Mobile Telecommunications System (UMTS), Long Term Evolution (LTE) network infrastructures, and so on.

In accordance with a standard GSM network, any of the network controller devices 110$a$-$c$ (NRC devices or other devices optionally having NRC functionality) may be associated with a base station controller (BSC), a mobile switching center (MSC), or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In some embodiments, any of the network controller devices 110a-c, the base stations 106a-e, as well as any of the UE 108a-m may be configured to run various operating systems, such as Microsoft® Windows®, Mac OS®, Google® Chrome®, Linux®, Unix®, or any mobile operating system, including Symbian®, Palm®, Windows Mobile®, Google® Android®, Mobile Linux®, and so on. Any of the network controller devices 110a-c, or any of the base stations 106a-e may employ any number of common server, desktop, laptop, and personal computing devices.

In some embodiments, any of the UE 108a-m may be associated with any combination of common mobile computing devices (e.g., laptop computers, tablet computers, cellular phones, handheld gaming units, electronic book devices, personal music players, MiFi™ devices, video recorders, and so on), having wireless communications capabilities employing any common wireless data communications technology, including, but not limited to: GSM, UMTS, 3GPP LTE, LTE Advanced, WiMAX, and so on.

In some embodiments, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments described herein, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
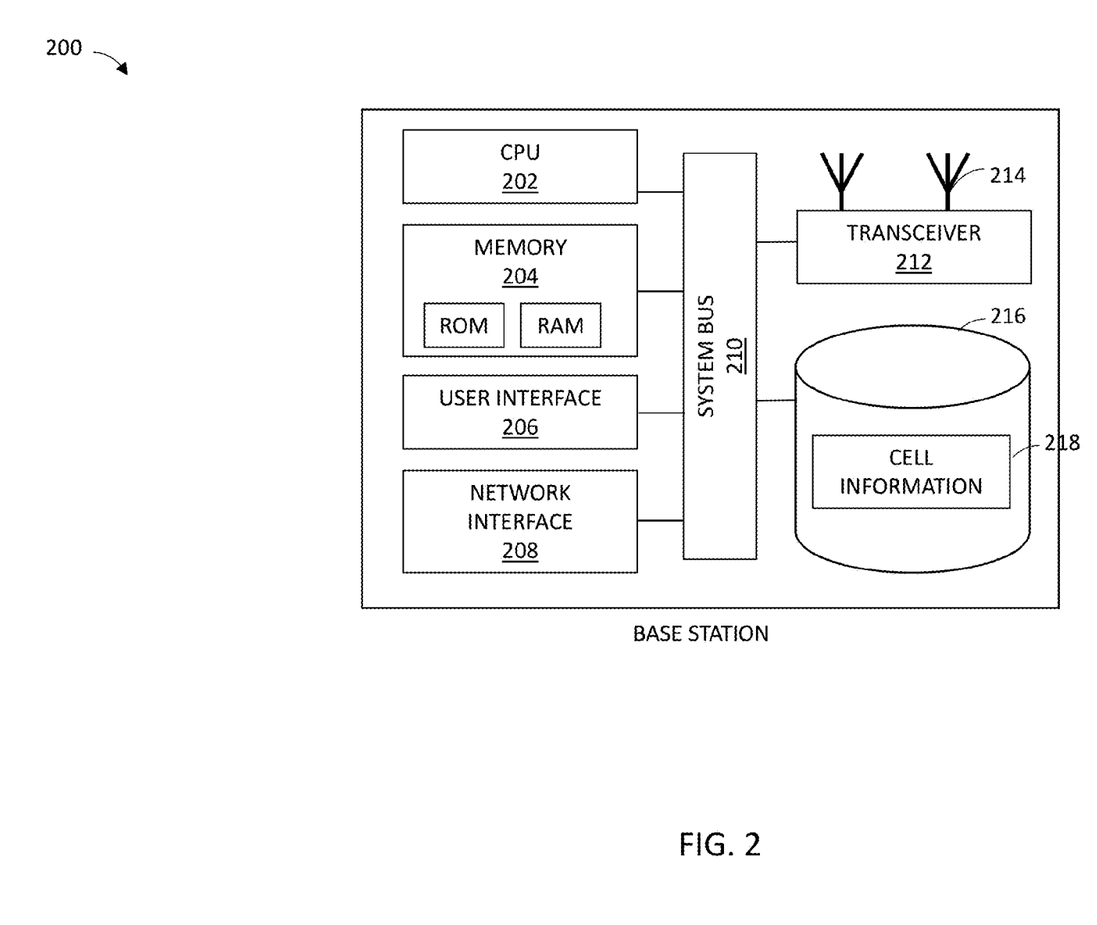
FIG. 2 is a block diagram illustrating a network resource controller.

FIG. 2 illustrates a block diagram of a base station or cell 200 (e.g., a cell, femtocell, picocell, microcell or macrocell) that may be representative of the base stations 106a-e in FIG. 1. In some embodiments, the base station 200 includes at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and nonvolatile (ROM) system memories 204.

The base station 200 may include a user interface 206 for inputting and retrieving data to and from the base station by operator personnel, and a network interface 208 coupled to a wireline portion of the network. Meanwhile, the base station 200 wirelessly sends and receives information to and from UE through a transceiver 212, which is equipped with one or more antenna 214.

The base station 200 may further include a system bus 210 and data storage 216. The system bus facilitates communication between the various components of the base station 200. For example, the system bus 210 may facilitate communication between a program stored in data storage 216 and the CPU 202, which executes the program. In some embodiments, data storage 216 may store information or parameters 218 for the base station 200, such as parameters identifying the geographical or network location of the base station 200, parameters identifying one or more carrier frequencies or operating bands via which the base station 200 operates, parameters identifying hierarchical relationships within the network between the base station 200 and other base stations (e.g., between the base station and neighboring cells), parameters associated with load-balancing or other performance metrics, parameters associated with a position, tilt, and/or geometry of an antenna, information identifying a currently or previously assigned scrambling code, and so on. In addition, data storage 216 may include an operating system, and various programs related to the operation of the base station 200.

As an example, in Radio Access Network Operational Support Systems (RAN OSSs), configuration data is typically stored in Managed Objects (MOs). Each MO can be retrieved when its Distinguished Name (DN) is known. MOs are often associated with physical or logical entities within the network. For example, a UtranCell MO may be associated with a logical UMTS cell, such as a UMTS base station. Each MO may have or be associated with multiple configurable parameters (e.g., a UtranCell MO may have associated parameters such as transmit power, handover offsets, or other described herein.).

At various times, changes are made to the MOs and/or parameters associated with the MOs. For example, some changes that may be applied to MOs and/or MO parameters include "update" type changes, where or more configurable parameters in the MO are changed, "add" type changes, where a new MO is added to the network, "delete" type changes, where an MO is deleted from the network, and so on.

In various embodiments, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, and so on) to send and receive information to and from UE through the transceiver 212. Additionally, the base station 200 may be configured to communicate with UEs 108a-m via any Cellular Data Communications Protocol, including any common GSM, UMTS, WiMAX or LTE protocol.

Figure 3:
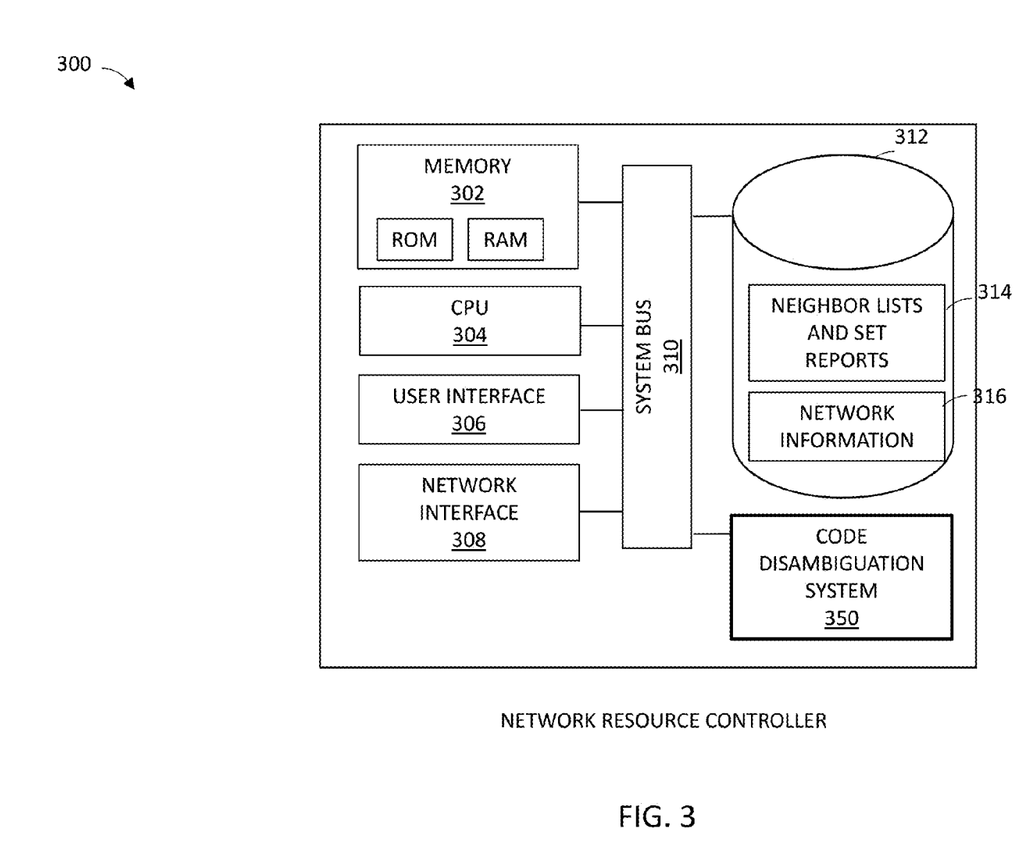
FIG. 3 is a block diagram illustrating a base station or cell.

FIG. 3 illustrates a block diagram of an NRC 300 that may be representative of any of the network controller devices 110a-c. In some embodiments, one or more of the network controller devices 110a-c are self-optimizing or self-organizing network (SON) controllers. The NRC 300 includes one or more processor devices including a central processing unit (CPU) 304. The CPU 304 may include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution.

The NRC 300 may also include a user interface 306 that allows an administrator to interact with the NRC's software and hardware resources and to display the performance and operation of the networked computing system 100. In addition, the NRC 300 may include a network interface 308 for communicating with other components in the networked computer system, and a system bus 310 that facilitates data communications between the hardware resources of the NRC 300.

In addition to the network controller devices 110*a-c*, the NRC 300 may be used to implement other types of computer devices, such as an antenna controller, an RF planning engine, a core network element, a database system, and so on. Based on the functionality provided by an NRC, the storage device of such a computer serves as a repository for software and database thereto.

The CPU 304 is responsible for executing computer programs stored on volatile (RAM) and nonvolatile (ROM) memories 302 and a storage device 312 (e.g., HDD or SSD). In some embodiments, the storage device 312 may store program instructions as logic hardware such as an ASIC or FPGA. The storage device 312 may include neighbor list information 314, measurement report information 316 (e.g., information associated with measured signal strengths or signal qualities for cells), set report information, and other information associated with the components and/or configuration of components within the network environment 100.

In some embodiments, the NRC includes a code disambiguation system 350 configured to resolve code uncertainties and/or disambiguate cell transmissions within the network, such as uncertainties associated with which cell is an origination cell of an identification code (e.g., scrambling code) detected by a UE 108*a-m* within the network environment 100.

Examples of Disambiguating Identification Codes in a Network

Figure 4:
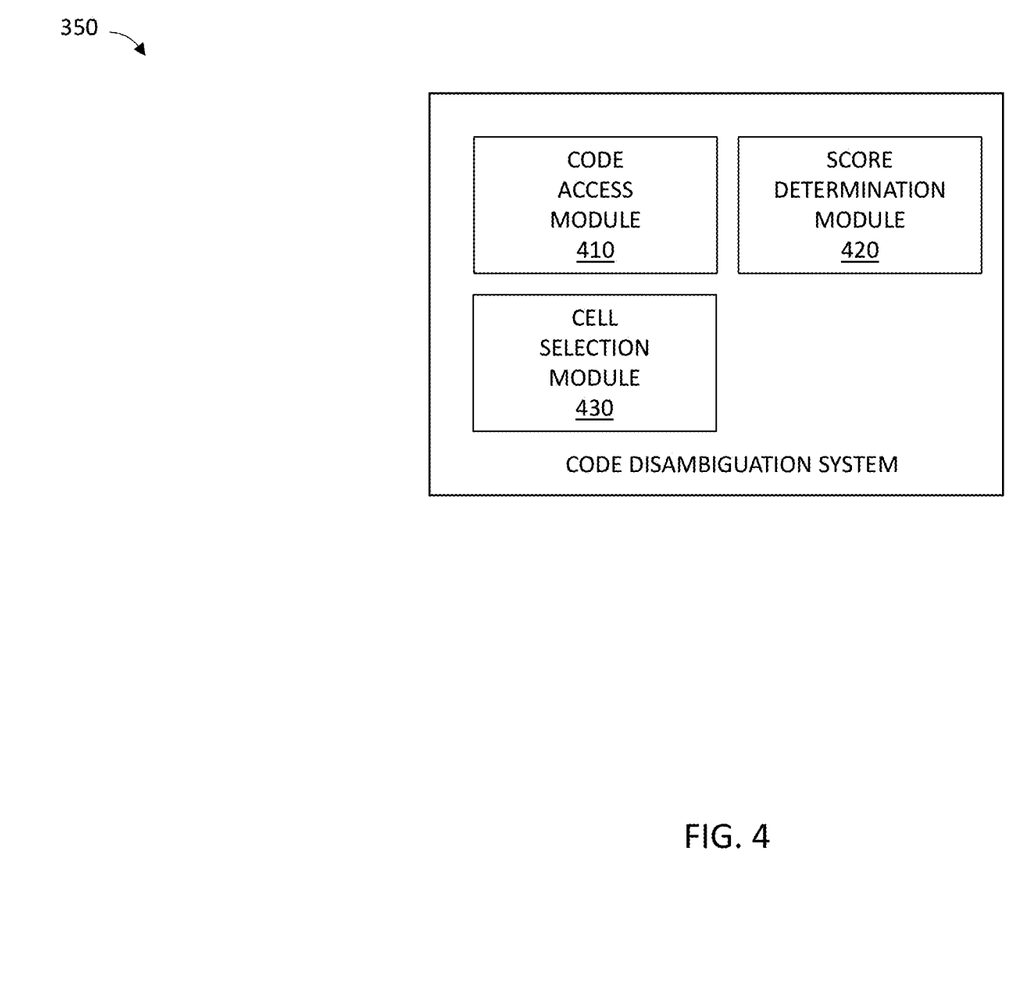
FIG. 4 is a block diagram illustrating the components of a code disambiguation system configured to disambiguate cells from an identification code in a wireless access network.

As described herein, in some embodiments, the code disambiguation system 350 resolves identification code disambiguities within the network environment 100. FIG. 4 is a block diagram illustrating the components of the code disambiguation system 350, which may include one or more modules and/or components to perform one or more operations of the code disambiguation system 350. The modules may be hardware, software, or a combination of hardware and software, and may be executed by one or more processors. For example, the code disambiguation system 350 may include a code access module 410, a score determination module 420, and a cell selection module 430.

In some embodiments, the code access module 410 is configured and/or programmed to access, receive, or retrieve an identification code associated with a cell in a wireless access network that is detected by a mobile device. For example, the code access module 410 may access a scrambling code associated with the cell in a 3G wireless access network, a PCI code associated with the cell in an LTE wireless access network, and so on.

In some embodiments, the score determination module 420 is configured and/or programmed to determine a probability score for candidate cells that are assigned the identification code in the wireless access network, the probability score based on a likelihood that a candidate cell is the cell in the wireless access network associated with the identification code detected by the mobile device.

In order to determine a probability score, the score determination module 420 may identify, calculate, and/or determine a variety of different metrics associated with a candidate cell and selected source cells, such as metrics that identify or calculate various metrics associated with a relationship between the candidate cell and the source cell. In some embodiments, the score determination module may perform operations to determine these metrics for one, some, or all cells within a network as source cells, in order to increase a determined probability of a candidate cell being an origination cell of an identification code detected by a mobile device.

For example, the score determination module 420 may determine a probability score for a candidate cell that is based on one or more of the following determinations:

A calculation of a number of intra-frequency neighbors that overlap between a predetermined source cell and the candidate cell;

A calculation of a number of scrambling codes that overlap between the predetermined source cell and the candidate cell;

A determination of whether the predetermined source cell is on a neighbor list associated with the candidate cell;

A determination of whether an inverse of the distance between the predetermined source cell and candidate cells sharing the same scrambling code if above a predetermined threshold;

A determination of whether the predetermined source cell is on a Detected Set Report associated with the candidate cell; and/or A calculation of an inverse of a distance or geoscore between the predetermined source cell and the candidate cell, where a geoscore defines a geometric connection or relationship between cells based on a distance between the cells and a direction at which the cell antennas are pointing with respect to one another.

In some embodiments, the cell selection module 430 is configured and/or programmed to select one of the candidate cells as an origination cell of the identification code detected by the mobile device based on the determined probability scores. For example, the cell selection module 430 may compare a highest probability score, which is assigned to a first candidate cell, to a second highest probability score, which is assigned to a second candidate score, and select the first candidate cell as the origination cell when the comparison satisfies a disambiguation threshold condition (e.g., the difference in scores is above a certain threshold difference). As another example, the cell selection module 430 may select a candidate cell as the origination cell when the determined probability score assigned to the candidate cell is above a disambiguation threshold score.

Figure 5:
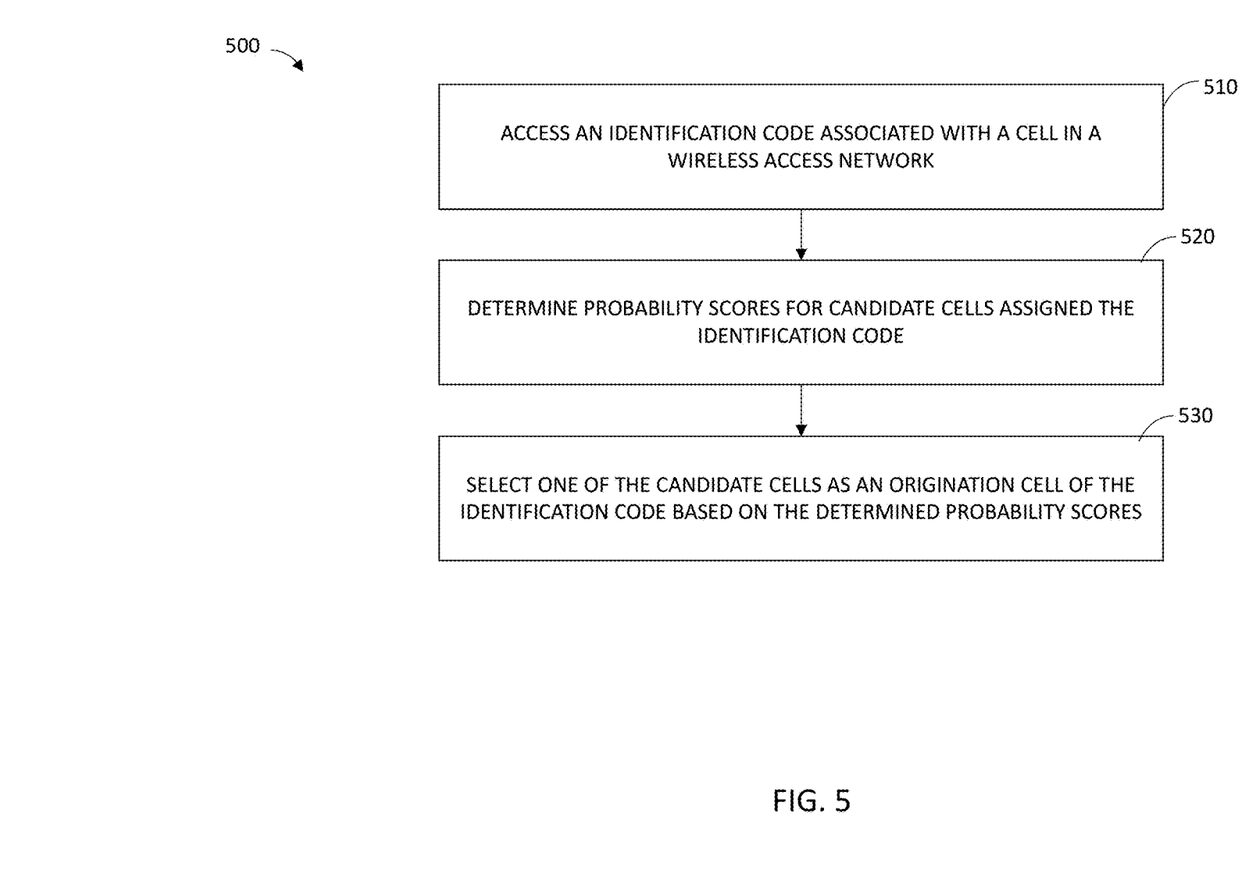
FIG. 5 is a flow diagram illustrating a method for disambiguating a cell from an identification code in a wireless access network.

As described herein, the code disambiguation system 350 may perform various algorithms, routines, and/or methods when identifying a cell as an origination cell of a detected identification code. FIG. 5 is a flow diagram illustrating a method 500 for disambiguating a cell from an identification code in a wireless access network. The method 500 may be performed by the code disambiguation system 350 and, accordingly, is described herein merely by way of reference thereto. It will be appreciated that the method 500 may be performed on any suitable hardware.

In operation 510, the code disambiguation system 350 accesses an identification code associated with a cell in a wireless access network that is detected by a mobile device. For example, the code access module 410 may access a scrambling code associated with the cell in a 3G wireless access network, a PCI code associated with the cell in an LTE wireless access network, and so on.

In operation 520, the code disambiguation system 350 determines a probability score for candidate cells that are assigned the identification code in the wireless access network, where the probability score is based on a likelihood that a candidate cell is a cell in the wireless access network associated with the identification code detected by the mobile device. For example, in order to determine a probability score, the score determination module 420 may identify, calculate, and/or determine a variety of different metrics associated with a candidate cell and selected source cells, such as metrics that identify or calculate various metrics associated with a relationship between the candidate cells and one or more source cells.

Figure 6:
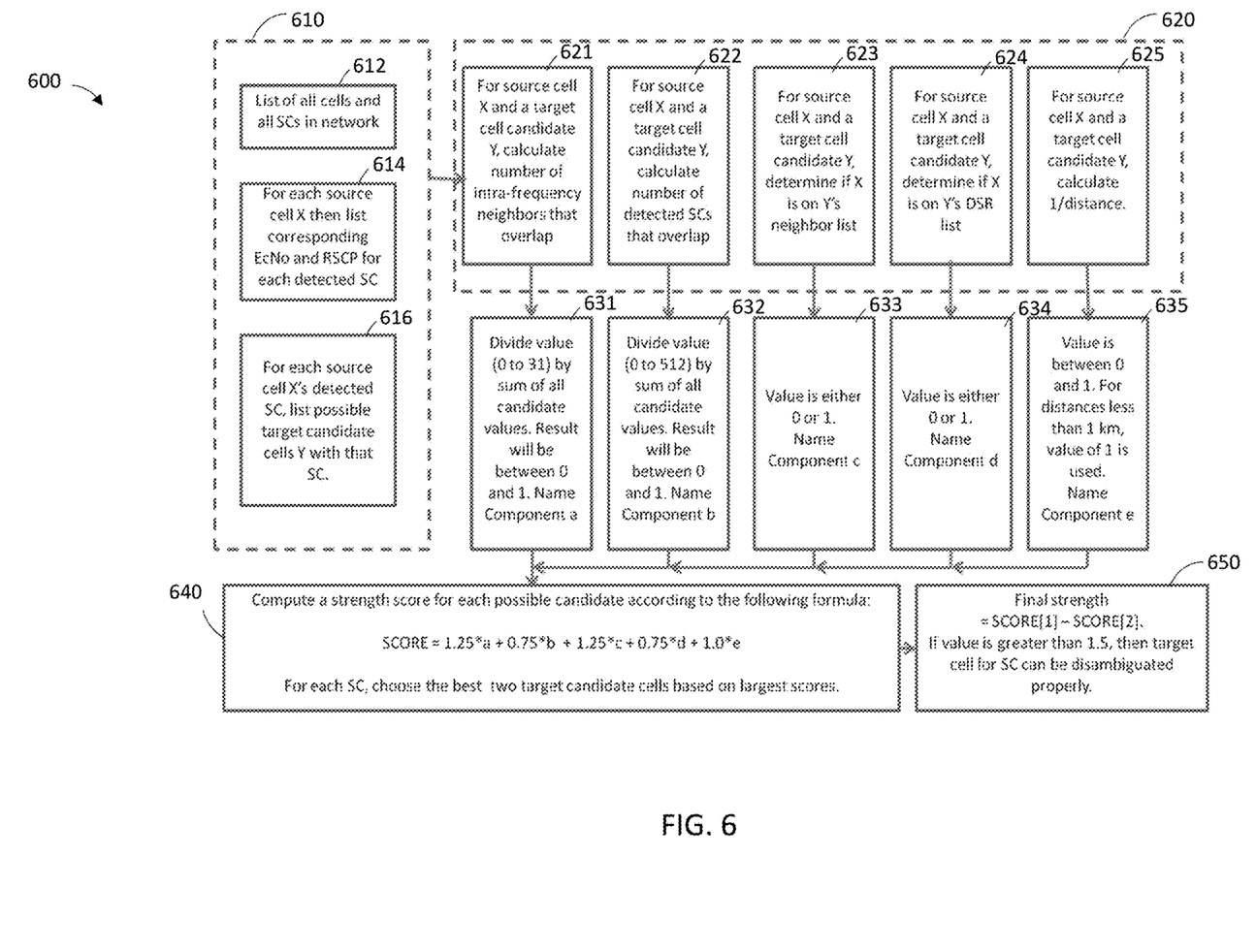
FIG. 6 is a flow diagram illustrating a method for determining disambiguation strength scores for cells in a wireless access network.

FIG. 6 is a flow diagram illustrating a method 600 for determining disambiguation strength scores for cells in a wireless access network. The method 600 may be performed by the code disambiguation system 350 and, accordingly, is described herein merely by way of reference thereto. It will be appreciated that the method 600 may be performed on any suitable hardware.

In operation 610, the code disambiguation system 350 identifies candidate cells for a detected scrambling code. For example, the code disambiguation system 350, in operation 612, generates or accesses a list of all cells and all scrambling codes (SCs) in a network (e.g., such as a list stored in storage 316 of NRC 110a-c). In operation 614, the code disambiguation system 614 generates or accesses, for each cell identified as a source cell, a list of corresponding signal measurements for each scrambling code, such as the Received Signal Code Power (RSCP), the received energy per total noise power density, or EcNo (or, RSCP divided by RSSI), and so on. In operation 616, the code disambiguation system 616 determines a list of potential or candidate cells associated with the scrambling codes.

In operation 620, the code disambiguation system 350 calculates various relationship metrics between the determined candidate cells and each of the selected source cells, which are provided as input for a computed strength score. In operation 640, the code disambiguation system 350 determines a disambiguation strength score for each of the candidate cells, the strength score based on the following formula:

$$\text{strength score} = 1.25a + 0.75b + 1.25c + 0.75d + 1.0e,$$

where a is a number of intra-frequency neighbors that overlap between a predetermined source cell and the candidate cell, divided by a sum of all candidate values (calculated in operation 621 and 631);

b is a number of scrambling codes that overlap between the predetermined source cell and the candidate cell, divided by the sum of all candidate values (calculated in operation 622 and 632);

c is equal to 1 if the predetermined source cell is on a neighbor list associated with the candidate cell or equal to 0 if the predetermined source cell is not on the neighbor list associated with the candidate cell (calculated in operation 623 and 633);

d is equal to 1 if the predetermined source cell is on a detected set report associated with the candidate cell or equal to 0 if the predetermined source cell is not on the detected set report associated with the candidate cell (calculated in operation 624 and 634); and e is an inverse of a distance or geoscore between the predetermined source cell and the candidate cell (calculated in operation 625 and 635).

In operation 650, the code disambiguation system 350 determines a final strength score by determining a difference between a first candidate cell having the highest strength score (calculated in operation 640) and a second candidate cell having the second highest strength score (calculated in operation 640), or, $$\text{Final strength score} = \text{highest score of any candidate cell} - \text{second highest score of any candidate cell.}$$

Referring back to FIG. 5, in operation 530, the code disambiguation system 350 selects one of the candidate cells as an origination cell of the identification code detected by the mobile device based on the determined probability scores. For example, the cell selection module 430 may compare a highest probability score, which is assigned to a first candidate cell, to a second highest probability score, which is assigned to a second candidate score (operation 650 of FIG. 6), and select the first candidate cell as the origination cell when the comparison satisfies a disambiguation threshold condition (e.g., the difference in scores is above a certain threshold difference of 1.5 or another determined threshold). As another example, the cell selection module 430 may select a candidate cell as the origination cell when the determined probability score assigned to the candidate cell is above a disambiguation threshold score (and not, for example, based on a comparison of scores between cells).

Of course, the code disambiguation system 350 may calculate various relationship metrics between the determined candidate cells and each of the selected source cells, such as various metrics that represent distances between source cells and candidate cells, geometrical or network-based relationships between source cells and candidate cells, and so on. For example, in addition to some or all of the metrics described herein, the code disambiguation system 350 may determine the distance from a source cell to cells sharing an ambiguous scrambling code, and when the ratio of the distance to the second closest cell with the scrambling code and the closest cell with the same scrambling code is greater than a threshold (e.g., greater than 5), then the closest cell may be the disambiguated cell.

Thus, in some embodiments, the code disambiguation system 350 may disambiguate a scrambling or other cell identification code detected within a wireless access network by determining a probability score for candidate cells that are assigned the scrambling code in the wireless access network via calculating a number of intra-frequency neighbors that overlap between a predetermined source cell and the candidate cell, calculating a number of scrambling codes that overlap between the predetermined source cell and the candidate cell, determining whether the predetermined source cell is on a neighbor list associated with the candidate cell, determining whether the predetermined source cell is on a detected set report associated with the candidate cell, and/or calculating an inverse of a distance or geoscore between the predetermined source cell and the candidate cell, and selecting a candidate cell having a determined probability score above a disambiguation threshold score (e.g., a highest determined probability score) as an origination cell of the scrambling code.

Example Code Disambiguation Process in a 3G Network

A network may utilize the code disambiguation system 350 described herein to disambiguate or unambiguously identify a cell associated with a reuse code that is listed in a Detected Set Report, among other things. For example, given handover success (HO_SUCCESS) metrics and other metrics (ECNO, RSCP, COUNT, and so on) associated with DSR reporting in 3G networks, the code disambiguation system 350 may resolve uncertainties associated with reporting in a network. The following example illustrates a procedure performed by the code disambiguation system 350 to resolve reuse code ambiguities within a network.

For each cell X in a network (e.g., in a market), the code disambiguation system 350 compiles a list of all existing outbound neighbors with unique Scrambling Codes (SCs) and also compiles a list of all SCs contained in the Detected Set Report (DSR) for the network.

Define neighbor cells as cells with >HO_SUCCESS (DEFAULT=80%).

Use DSR report that includes a rolling one week's worth of data, and include SCs that exceed COUNT, ECNO and RSCP thresholds and are less than the distance threshold.

Use the following settings: SC_COUNT (DEFAULT=10), SC_ECNO (DEFAULT=−17), SC_RSCP (DEFAULT=−105), and SC_DISTANCE_THRESHOLD (DEFAULT=35 km), where the settings are selected in order to "see" as many SCs as possible to increase accuracy of resolving any ambiguous scrambling codes.

The code disambiguation system 350 combines the lists and records the unique scrambling codes.

For each cell X, the code disambiguation system 350 starts with the first SC A on the list and identifies every cell (Y) in the market that uses SC A, or [X, A, Y]. For example,

| Source Cell | Scrambling Code | Candidate Cell |
|---|---|---|
| USE0385A21 | 0 | USE2101B11 |
| USE0385A21 | 0 | USE01990C21 |
| USE0385A21 | 0 | USE04563A11 |
| ... | | |
| USE0385A21 | 11 | USE03865I21, | and so on.

The code disambiguation system 350, for each [X, A, Y], determines five scores, as follows:

$$[X,A,Y]=[NBR\_OVERLAP,DSR\_OVERLAP,NBR\_INVERSE,DSR\_INVERSE,1/DISTANCE],$$

where:

NBR_OVERLAP is defined as the number of intra-frequency outbound neighbors on cell X's neighbor list that overlap with the intra-frequency outbound neighbors on Cell Y's neighbor list. The result could be a maximum of 31 or as low as 0;

DSR_OVERLAP is the number of Cell X's list of (DSR AND Neighbor SCs) that overlap with Cell Y's (DSR SCs only, no neighbors). The result could be a maximum of 512 or as low as 0;

NBR_INVERSE is defined as 0 or 1. A 1 is assigned if Cell X exists on Cell Y's neighbor list. A 0 is assigned otherwise;

DSR_Inverse is defined as 0 or 1. A 1 is assigned if Cell X's SC is found on Cell Y's DSR report. A 0 is assigned if Cell X's SC is NOT found on Cell Y's DSR report; and 1/DISTANCE is defined as the 1 divided by the distance between Cell X and Cell Y (in km). Only values between 0 and 1 are allowed. For inter-site distances less than 1 km, a value of 1 will be chosen.

The code disambiguation system 350 determines, for each [X, A], five scores that are the element wise sums of all Y candidates for each [X, A], where $$[X,A]=[sum(NBR\_OVERLAP),sum(DSR\_OVERLAP),sum(NBR\_INVERSE),sum(DSR\_INVERSE),sum(1/DISTANCE)].$$

The code disambiguation system 350, for each [X, A, Y], calculates a resolution score using the above values, where RESOLVE[X, A, Y]=[X, A, Y]/[X, A]. Each of the five elements should result in a value between 0 and 1, but in the event there is a divide by zero error, then the value may be assigned a 0.

The code disambiguation system 350 calculates an interim score for each [X, A, Y], or $$INTERIM\_SCORE[X,A,Y]=1.25*a+0.75*b+1.25*c+0.75*d+1.0*e,$$

Where the score will result in a value between 0 and 5 (the higher the number, the more likely that the Candidate Cell Y is the cell that belongs to SC A).

The code disambiguation system 350 determines the two Y's with the highest interim score for a given X, A pair, and calculates the disambiguation strength of the scrambling code (or neighbor) identified by Cell X, by $$STRENGTH[X,A]=absolutevalue(SCORE[X,A,Y_1]-SCORE[X,A,Y_2]).$$

The code disambiguation system 350 records the cell Y identity for the cell with the highest score between SCORE [X, A, $Y_1$] and SCORE[X, A, $Y_2$], where TOP[X,A]=Cell Y name that has the highest score between SCORE[X,A,$Y_1$] and SCORE[X,A,$Y_2$] and SECOND[X,A]=Cell Y name that has the second highest score between SCORE[X,A,$Y_1$] and SCORE[X,A,$Y_2$]

The code disambiguation system 350 determines the TOP and SECOND names for all [X, A] in the network, and generates a list of many entries, as follows:

| Source Cell | Scrambling Code | Disambiguation Strength | Top Candidate |
|---|---|---|---|
| USE0385A21 | 0 | 3.2 | USE01990C21 |
| USE0385A21 | 11 | 1.3 | U5E03865I21, | and so on.

Therefore, the code disambiguation system 350 identifies the origination cell of SC 0 as candidate cell USE01990C21, because the disambiguation strength is 3.2 and greater than a predetermined threshold value (1.5) for disambiguation Examples of Applying Code Disambiguation to Automated Network Management Systems As described herein, in some embodiments, automated network management systems, such as scrambling code optimization processes and/or ANR processes, may utilize the code disambiguation system 350 to determine reliable and certain information such as information identifying the cells associated with detected scrambling codes, among other benefits.

Figure 7:
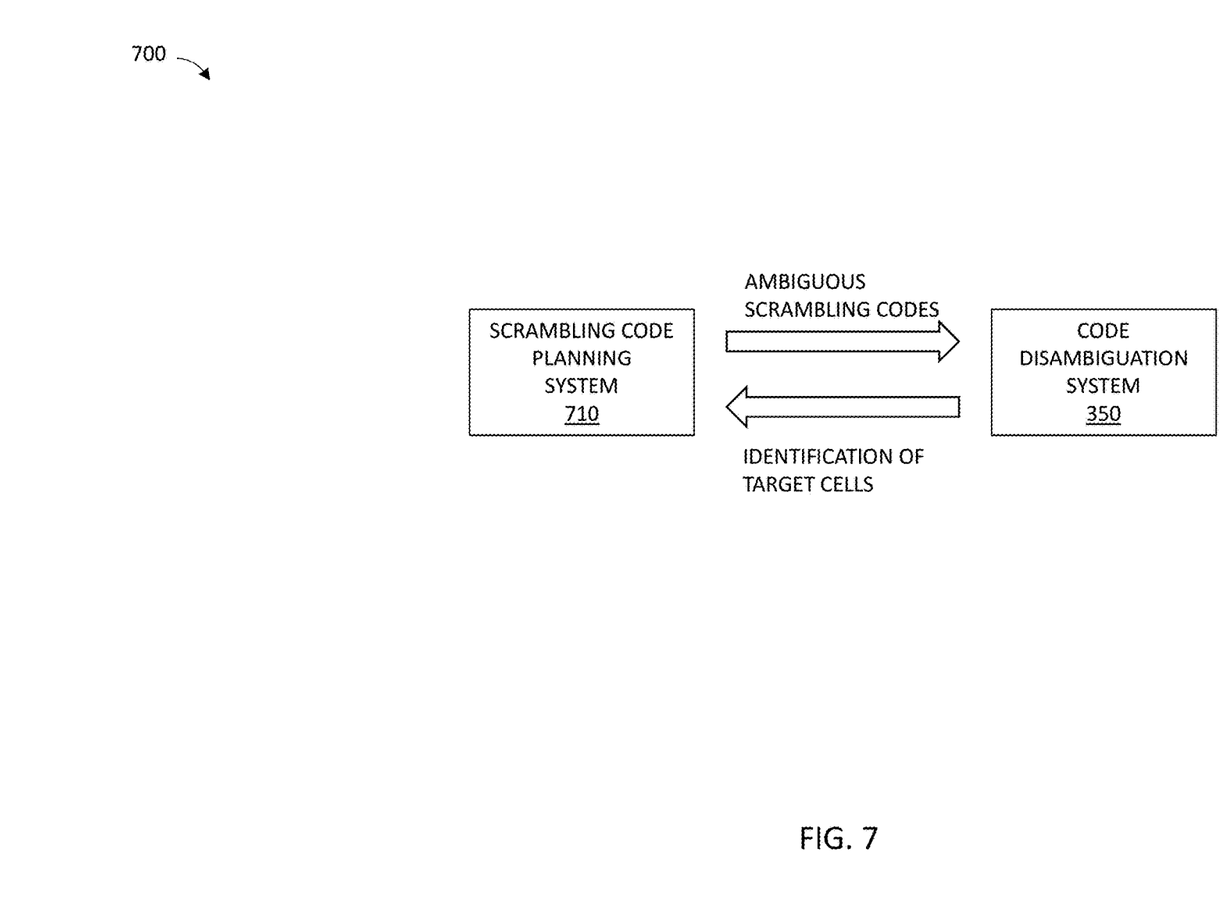
FIG. 7 is a block diagram illustrating interactions between a code planning system and a code disambiguation system.

As an example, FIG. 7 is a block diagram 700 illustrating interactions between a scrambling code optimization system 710 and the code disambiguation system 350. The scrambling code optimization system 710, which may be configured to optimize the allocation of scrambling codes to cells within a network, may provide ambiguous scrambling codes detected by cells in the network to the code disambiguation system 350 described herein. The code disambiguation system 350, using one or more operations described herein, may resolve any uncertainties (e.g., identify cells associates with the ambiguous scrambling codes), and provide resolution information to the scrambling code planning system 710.

Figure 8:
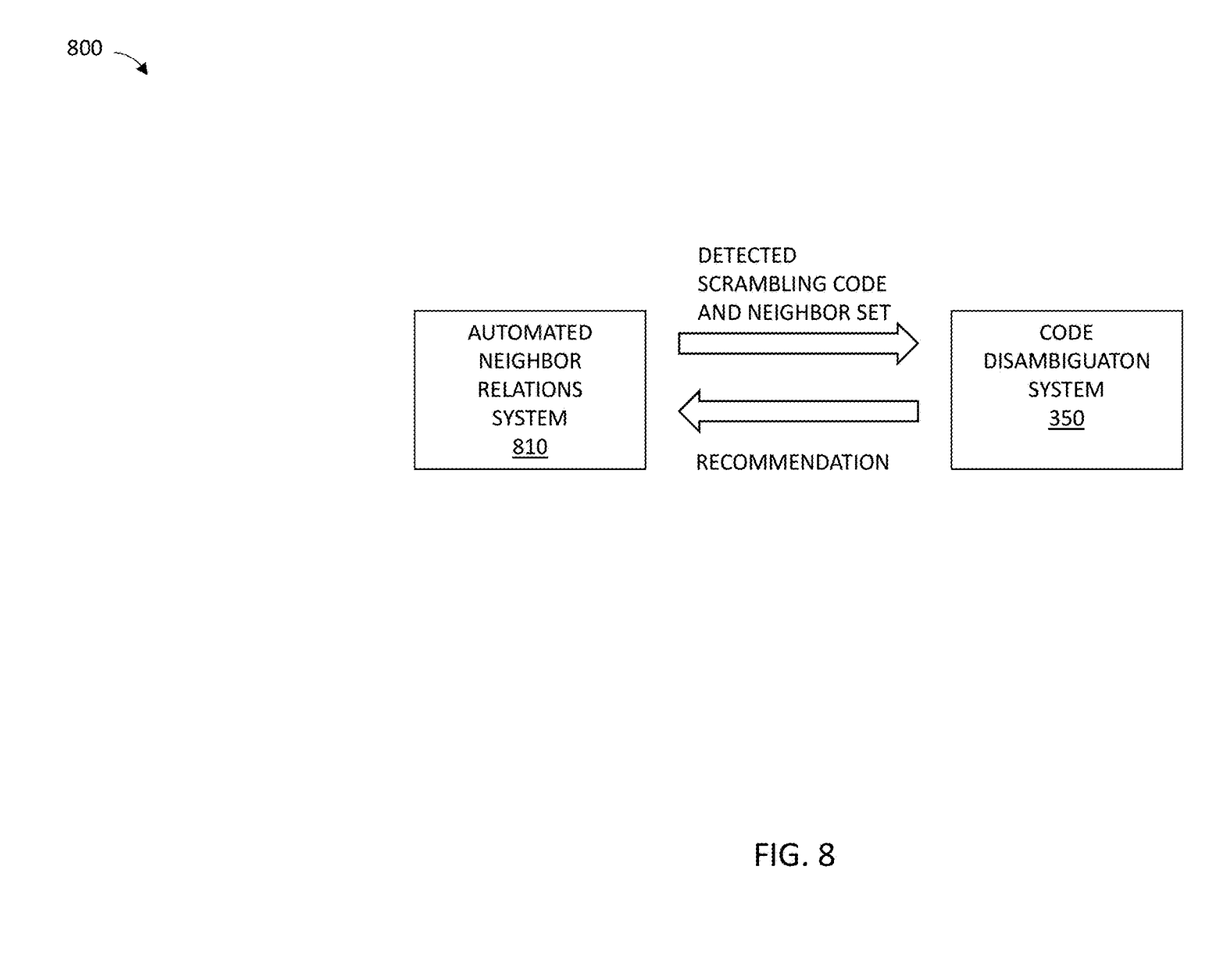
FIG. 8 is a block diagram illustrating interactions between an automated neighbor relations system and a code disambiguation system.

As another example, FIG. 8 is a block diagram 800 illustrating interactions between an automated neighbor relations system 810 and the code disambiguation system 350. In some embodiments, the automated neighbor relations system 810 may add new neighbors to a cell's neighbor list during automated neighbor list optimization via ANR, utilizing the code disambiguation system 350 as follows:

After determining that a detected set SC and neighbor meets COUNT/ECNO/RSCP requirements for addition, the automated neighbor relations system 810 may prevent ambiguous neighbors from being added by using an ADDITION_STRENGTH (DEFAULT=2.5) threshold value. Thus, when an ADDITION_STRENGTH value calculated for the potential neighbor add by the code disambiguation system 350 does not exceed the ADDITION_STRENGTH threshold, the potential neighbor will not be added.

In some embodiments, the automated neighbor relations system 810 may remove neighbors from a cell's neighbor list during automated neighbor list optimization via ANR, utilizing the code disambiguation system 350 as follows:

On each neighbor list or HO report, there is information identifying the existing neighbor and then the top neighbor that belongs to that SC. In many cases, they are the same cell. In this case the existing neighbor should be removed or dynamically blacklisted. For existing neighbors where the handover success rate and strength of existing neighbor is low, the existing neighbor should be removed or blacklisted temporarily.

If STRENGTH, calculated by the code disambiguation system 350, of existing neighbor is less than REMOVAL_STRENGTH (DEFAULT=1.0) and HO success rate is <HO_SUCCESS_RATE (DEFAULT=80%) then the automated neighbor relations system 810 removes the neighbor from the neighbor list.

Of course, other systems, scenarios and/or implementations are possible and supported by the code disambiguation system 350 described herein.

Although aspects of the present technology have been described with respect to specific examples, embodiments of the present technology are not limited by these examples. For example, persons of skill in the art will recognize that pre-delivering content to user devices may be performed according to various other algorithms and processes without departing from the scope or spirit of the present technology.

What is claimed is:

1. A method, comprising:
   receiving a non-unique identification code of a cell detected by a mobile device in a wireless telecommunications network;
   determining probability scores for respective candidate cells that are assigned the non-unique identification code, each respective probability score being based on a likelihood that the associated respective candidate cell is the source of the first non-unique identification code of the cell detected by the mobile device; and
   selecting a candidate cell with a highest probability score as an origination cell of the first non-unique identification code,
   wherein determining probability scores includes:
      determining a code overlap factor based on a number of cell identification codes that overlap between a first list of cell identification codes for a predetermined source cell and a second list of cell identification codes for an associated candidate cell; and
      incrementing a probability score for the associated candidate cell by the code overlap factor,
   wherein the first list of cell identification codes includes cell identification codes from detected set reports (DSRs) associated with the source cell and cell identification codes from a neighbor list of the source cell, and
   wherein the second list of cell identification codes includes cell identification codes from DSRs associated with the candidate cell and does not include cell identification codes from a neighbor list of the candidate cell.

2. The method of claim 1, wherein each of the probability scores includes a distance factor that is inversely proportional to a distance between the predetermined source cell and the associated candidate cell.

3. The method of claim 1, wherein determining the probability scores further includes:
   determining whether the predetermined source cell is on a neighbor list of the associated candidate cell; and
   increasing the probability score for the associated candidate cell when the predetermined source cell is on the neighbor list of the associated candidate cell.

4. The method of claim 1, wherein determining the probability score includes:
   determining whether an identifier of the predetermined source cell is on a the DSRs of the associated candidate cell; and
   increasing the probability score for the associated candidate cell when the predetermined source cell is on the DSR of the associated candidate cell.

5. The method of claim 1, wherein determining the probability scores includes:
   determining a neighbor overlap factor based on a number of intra-frequency outbound neighbor cells that overlap between a neighbor list of the predetermined source cell and a neighbor list of the associated candidate cell; and
   incrementing the probability score for the associated candidate cell by the neighbor overlap factor.

6. The method of claim 1, wherein the mobile device is connected to the source cell, the method further comprising:
   updating a neighbor list of the source cell to include the origination cell.

7. The method of claim 1, further comprising:
   comparing a probability score between the origination cell and a source cell that shares the non-unique identification code to a threshold value; and
   when the probability score is less than the threshold value, removing the origination cell from a neighbor list of the source cell.

8. The method of claim 1, wherein the non-unique identification code is detected by the mobile device and transmitted to a base station serving the mobile device in a DSR.

9. A network resource controller apparatus coupled to a wireless telecommunications network, the network resource controller apparatus comprising:
   one or more memory that stores a plurality of computer-executable instructions thereon and non-unique identification code of a cell detected by a mobile device in the wireless telecommunications network; and
   a processor that executes the plurality of computer-executable instructions stored on the one or more memory, causing the network resource controller to perform the following operations:
   determining probability scores for respective candidate cells that are assigned the non-unique identification code, each respective probability score being based on a likelihood that the associated respective candidate cell is the source of the first non-unique identification code of the cell detected by the mobile device; and
   selecting a candidate cell with a highest probability score as an origination cell of the first non-unique identification code,
   wherein determining probability scores includes:
      determining a code overlap factor based on a number of cell identification codes that overlap between a first list of cell identification codes for a predetermined source cell and a second list of cell identification codes for an associated candidate cell; and incrementing a probability score for the associated candidate cell by the code overlap factor, wherein the first list of cell identification codes includes cell identification codes from detected set reports (DSRs) associated with the source cell and cell identification codes from a neighbor list of the source cell, and wherein the second list of cell identification codes includes cell identification codes from DSRs associated with the candidate cell and does not include cell identification codes from a neighbor list of the candidate cell.

10. The apparatus of claim 9, wherein each of the probability scores includes a distance factor that is inversely proportional to a distance between the predetermined source cell and the associated candidate cell.

11. The apparatus of claim 9, wherein determining the probability scores includes:

determining whether the predetermined source cell is on a neighbor list of the associated candidate cell; and increasing the probability score for the associated candidate cell when the predetermined source cell is on the neighbor list of the associated candidate cell.

12. The apparatus of claim 9, wherein determining the probability scores includes:

determining whether the identifier of a predetermined source cell is on the DSRs of the associated candidate cell; and increasing the probability score for the associated candidate cell when the predetermined source cell is on the DSRs of the associated candidate cell.

13. The apparatus of claim 9, wherein determining the probability scores includes:

determining a neighbor overlap factor based on a number of intra-frequency outbound neighbor cells that overlap between a neighbor list of the predetermined source cell and a neighbor list of the associated candidate cell; and incrementing a probability score for the associated candidate cell by the neighbor overlap factor.

14. The apparatus of claim 9, wherein the non-unique identification code is detected by the mobile device and transmitted to a base station serving the mobile device in a DSR.

15. A non-transitory computer-readable storage medium whose contents, when executed by a computing system, cause the computing system to perform operations for disambiguating a scrambling code assigned to cells in a wireless telecommunications network, the operations comprising:

receiving a non-unique identification code of a cell detected by a mobile device in the wireless telecommunications network;

determining probability scores for respective candidate cells that are assigned the non-unique identification code, each respective probability score being based on a likelihood that the associated respective candidate cell is the source of the first non-unique identification code of the cell detected by the mobile device; and selecting a candidate cell with a highest probability score as an origination cell of the first non-unique identification code, wherein determining probability scores includes:

determining a code overlap factor based on a number of cell identification codes that overlap between a first list of cell identification codes for a predetermined source cell and a second list of cell identification codes for an associated candidate cell; and incrementing a probability score for the associated candidate cell by the code overlap factor, wherein the first list of cell identification codes includes cell identification codes from detected set reports (DSRs) associated with the source cell and cell identification codes from a neighbor list of the source cell, and wherein the second list of cell identification codes includes cell identification codes from DSRs associated with the candidate cell and does not include cell identification codes from a neighbor list of the candidate cell.

* * * * *